(12) United States Patent
Nakamura et al.

(10) Patent No.: US 11,049,660 B2
(45) Date of Patent: Jun. 29, 2021

(54) MULTI-LAYER CERAMIC ELECTRONIC COMPONENT AND METHOD OF PRODUCING THE SAME

(71) Applicant: Taiyo Yuden Co., Ltd., Tokyo (JP)

(72) Inventors: Tomoaki Nakamura, Tokyo (JP); Mikio Tahara, Tokyo (JP); Koichiro Morita, Tokyo (JP); Tetsuhiko Fukuoka, Tokyo (JP); Shoji Kusumoto, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 59 days.

(21) Appl. No.: 16/354,811

(22) Filed: Mar. 15, 2019

(65) Prior Publication Data

US 2019/0304697 A1 Oct. 3, 2019

(30) Foreign Application Priority Data

Mar. 28, 2018 (JP) .............................. JP2018-061251
Dec. 10, 2018 (JP) .............................. JP2018-231086

(51) Int. Cl.
*H01G 4/30* (2006.01)
*H01G 4/12* (2006.01)
*H01G 4/012* (2006.01)
*H01G 4/248* (2006.01)

(52) U.S. Cl.
CPC .............. *H01G 4/30* (2013.01); *H01G 4/012* (2013.01); *H01G 4/1227* (2013.01); *H01G 4/248* (2013.01)

(58) Field of Classification Search
CPC .......... H01G 4/33; H01G 4/012; H01G 4/232; H01G 4/30; H01G 4/1227; H01G 4/12; H01G 2/065; H01G 2/24; H01G 4/0085; H01G 4/20; H01G 4/2325; H01G 4/306
See application file for complete search history.

(56) References Cited

U.S. PATENT DOCUMENTS

| | | | |
|---|---|---|---|
| 2012/0075766 A1* | 3/2012 | Nishioka | H01G 4/005 361/301.4 |
| 2013/0308246 A1* | 11/2013 | Lee | H01G 4/30 361/301.4 |
| 2013/0340920 A1 | 12/2013 | Matsui et al. | |
| 2017/0018363 A1* | 1/2017 | Tanaka | H01G 4/232 |

FOREIGN PATENT DOCUMENTS

JP 2012-209539 A 10/2012

* cited by examiner

*Primary Examiner* — Michael P McFadden
(74) *Attorney, Agent, or Firm* — Saliwanchik, Lloyd & Eisenschenk

(57) ABSTRACT

A multi-layer ceramic electronic component includes a ceramic body including: a multi-layer unit including a capacitance forming unit including ceramic layers laminated in a first direction and internal electrodes disposed therebetween, a side surface facing in a second direction orthogonal to the first direction, an end surface facing in a third direction orthogonal to the above directions, a drawn portion extending from the capacitance forming unit in the third direction, the internal electrodes being drawn to the end surface, and a cover that covers the capacitance forming unit and the drawn portion in the first direction; and a side margin that covers the side surface. The drawn portion includes a first region and a second region disposed between the cover and the first region, an end portion of each internal electrode in the second region being positioned inward in the second direction relative to that in the first region.

4 Claims, 12 Drawing Sheets

MULTI-LAYER CERAMIC ELECTRONIC COMPONENT AND METHOD OF PRODUCING THE SAME

CROSS-REFERENCE TO RELATED APPLICATIONS

This application claims the benefit of Japanese Application Nos. 2018-061251, filed Mar. 28, 2018; and 2018-231086, filed Dec. 10, 2018; which are hereby incorporated by reference in their entirety.

BACKGROUND

The present disclosure relates to a multi-layer ceramic electronic component including side margins provided in a later step, and to a method of producing the multi-layer ceramic electronic component.

Representative multi-layer ceramic electronic components include multi-layer ceramic capacitors. In recent years, along with miniaturization of electronic devices and achievement of high performance thereof, there have been increasingly strong demands for increase in capacitance or the like with respect to the multi-layer ceramic capacitors. In order to meet those demands, for example, it is effective to enlarge an intersectional area of internal electrodes of the multi-layer ceramic capacitor as much as possible.

In order to enlarge the intersectional area of the internal electrodes, for example, Japanese Patent Application Laid-open No. 2012-209539 discloses an effective technique of providing, in a later step, side margins for ensuring insulation properties of the periphery of internal electrodes to a multi-layer chip including internal electrodes exposed on the side surfaces thereof. This technique enables the side margins to be thinned, which makes it possible to relatively enlarge the intersectional area of the internal electrodes.

SUMMARY

In the technique of providing the side margins in a later step as described above, a difference in density is caused between the pressure-bonded multi-layer chip and the side margin provided in a later step, and when the obtained ceramic body is chamfered, the internal electrodes are exposed from a corner portion in some cases. For that reason, moisture or a plating solution is likely to infiltrate from the portion from which the internal electrodes are exposed, which leads to reduction in moisture resistance of the multi-layer ceramic capacitor.

In view of the circumstances as described above, it is desirable to provide a multi-layer ceramic electronic component having moisture resistance and a large capacitance, and a method of producing the multi-layer ceramic electronic component.

According to an embodiment of the present disclosure, there is provided a multi-layer ceramic electronic component including a ceramic body. The ceramic body includes a multi-layer unit and a side margin.

The multi-layer unit includes a capacitance forming unit, a side surface, an end surface, a drawn portion, and a cover. The capacitance forming unit includes ceramic layers that are laminated in a first direction, and internal electrodes disposed between the ceramic layers. The side surface faces in a second direction orthogonal to the first direction. The end surface faces in a third direction orthogonal to the first direction and the second direction. The drawn portion extends from the capacitance forming unit in the third direction, the internal electrodes being drawn to the end surface. The cover has a dimension less than 20 µm in the first direction and covers the capacitance forming unit and the drawn portion in the first direction.

The side margin has a dimension less than 20 µm in the second direction and covers the side surface of the multi-layer unit.

The drawn portion includes a first region that is disposed at a center portion in the first direction, and a second region that is disposed between the cover and the first region, an end portion of each of the internal electrodes in the second direction in the second region being positioned inward in the second direction relative to an end portion of each of the internal electrodes in the second direction in the first region.

With this configuration, since the end portions of the internal electrodes in the second direction, the internal electrodes being located in the second region of the drawn portion, are positioned inward in the second direction relative to the end portions of the internal electrodes in the second direction in the first region, a region in which the internal electrodes are not disposed is formed at a corner portion of the multi-layer unit. Accordingly, a distance from the outside of the ceramic body to the internal electrodes can be ensured at that corner portion, so that the internal electrodes are inhibited from being exposed to the outside, and moisture resistance is improved.

In addition thereto, in the configuration described above, the region in which the internal electrodes are not disposed in the second region is formed only in the vicinity of the corner portion of the ceramic body, in which the side margin is particularly likely to be thin, i.e., only at the corner portion of the multi-layer unit. Thus, it is possible to improve moisture resistance while maintaining an intersectional area. Therefore, the multi-layer ceramic electronic component having this configuration can have high moisture resistance and ensure a large capacitance.

Conditions of 5 µm≤b≤2.5a, and a+b≥15 µm may be satisfied, where a represents a dimension of the side margin in the second direction, and b represents a distance in the second direction between the end portion of each of the internal electrodes in the second direction, which are disposed in the second region, and the end portion of each of the internal electrodes in the second direction, which are disposed in the first region.

Further, conditions of 5 µm≤d≤2.5c, and c+d≥15 µm may be satisfied, where c represents a dimension of the cover in the first direction, and d represents a distance in the first direction between one of the internal electrodes that is disposed on an outermost layer in the first region and another one of the internal electrodes that is disposed on an outermost layer in the second region.

When the conditions described above are satisfied, it is possible to improve moisture resistance and an electrostatic capacitance in better balance.

According to another embodiment of the present disclosure, there is provided a method of producing a multi-layer ceramic electronic component, the method including: producing a multi-layer unit including a capacitance forming unit including ceramic layers that are laminated in a first direction, and internal electrodes disposed between the ceramic layers, a side surface that faces in a second direction orthogonal to the first direction, an end surface that faces in a third direction orthogonal to the first direction and the second direction, a drawn portion that extends from the capacitance forming unit in the third direction, the internal electrodes being drawn to the end surface, and a cover that covers the capacitance forming unit and the drawn portion in the first direction, the drawn portion including a first region that is disposed at a center portion in the first direction, and a second region that is disposed between the cover and the first region, an end portion of each of the internal electrodes in the second direction in the second region being positioned inward in the second direction relative to an end portion of each of the internal electrodes in the second direction in the first region; forming a side margin on the side surface and producing a ceramic body; and chamfering the ceramic body.

The ceramic body may be chamfered by barrel polishing.

With this configuration, it is possible to produce a multi-layer ceramic electronic component having moisture resistance and a large capacitance as described above.

Further, with this configuration, when the ceramic body is chamfered by the barrel polishing or the like, even if the corner portion of the ceramic body is worn to a large extent, the internal electrodes are not exposed. Therefore, when external electrodes are formed on the ceramic body, it is possible to inhibit a plating solution from infiltrating into the multi-layer unit.

As described above, according to the present disclosure, it is possible to provide a multi-layer ceramic electronic component having moisture resistance and a large capacitance, and a method of producing the multi-layer ceramic electronic component.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. General Outline of Multi-layer Ceramic Capacitor 10

Figure 1:
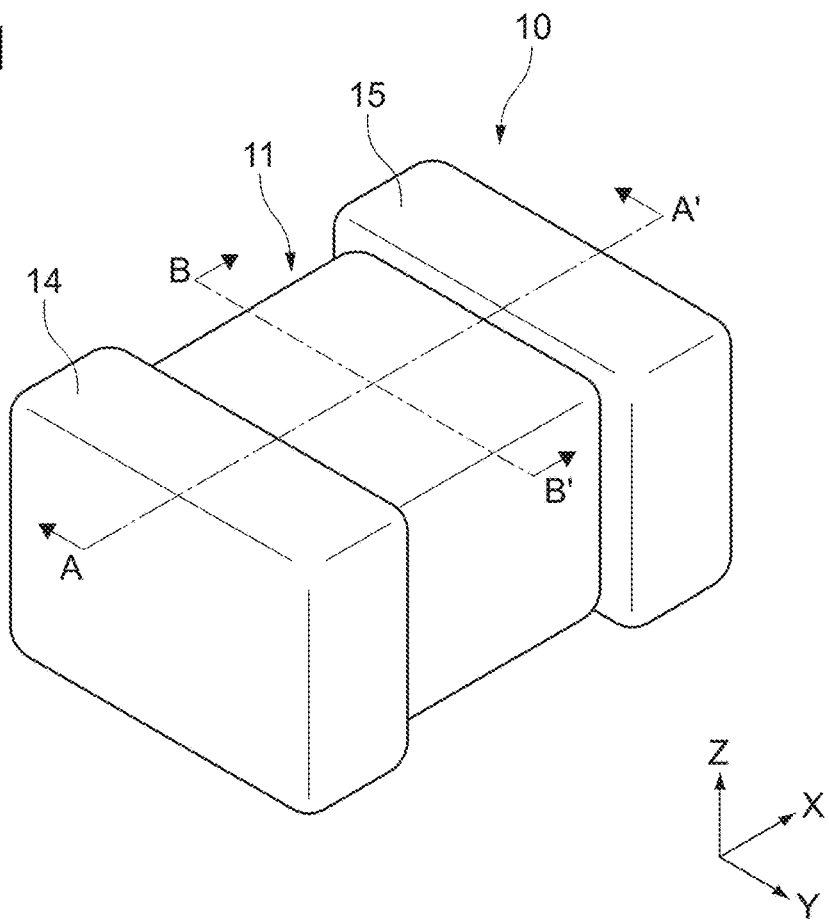
FIG. 1 is a perspective view of a multi-layer ceramic capacitor according to an embodiment of the present disclosure.
Figure 2:
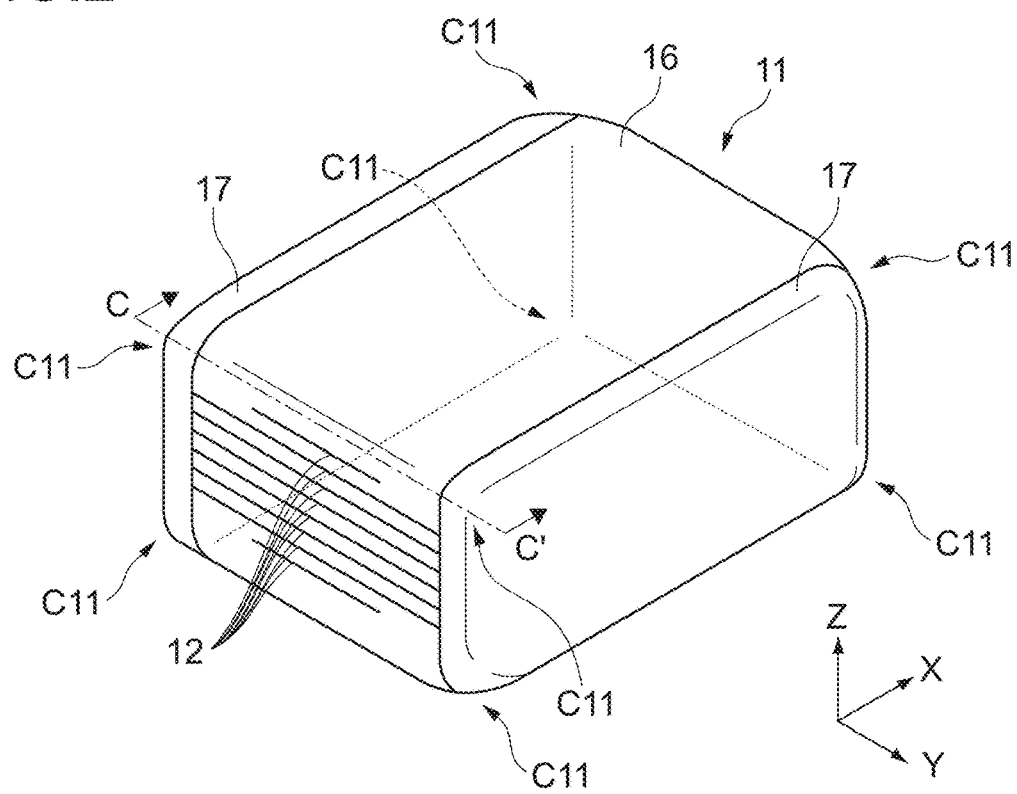
FIG. 2 is a perspective view of a ceramic body of the multi-layer ceramic capacitor.
Figure 3:
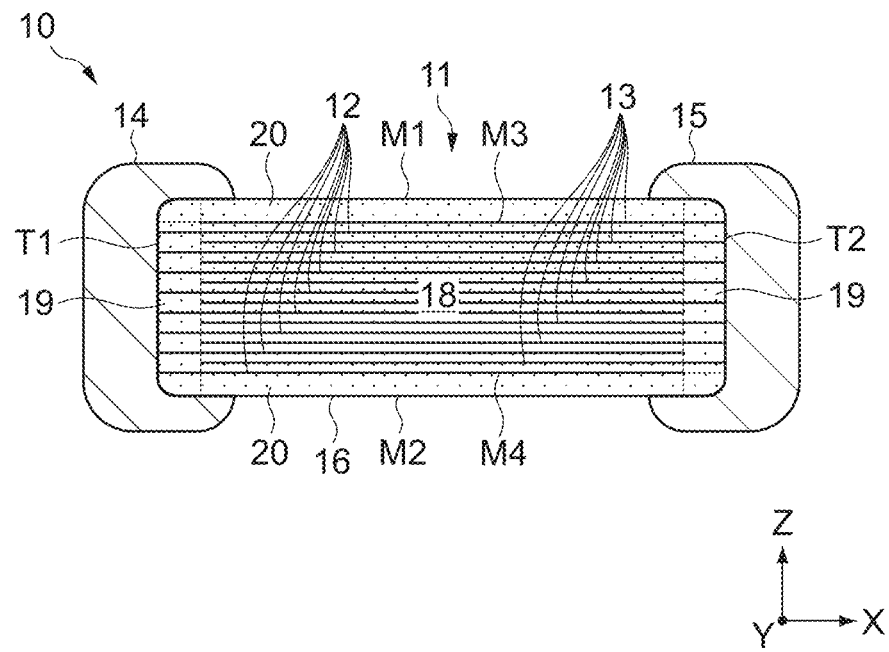
FIG. 3 is a perspective view of the multi-layer ceramic capacitor taken along the A-A' line in FIG. 1.
Figure 4:
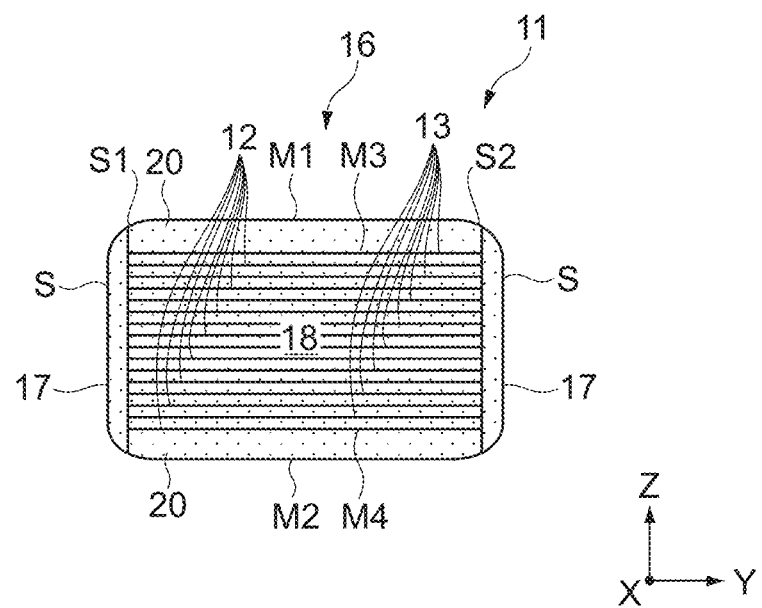
FIG. 4 is a cross-sectional view of the multi-layer ceramic capacitor taken along the B-B' line in FIG. 1.

FIGS. 1 to 4 each show a multi-layer ceramic capacitor 10 according to an embodiment of the present disclosure. FIG. 2 is a perspective view of a ceramic body 11 of the multi-layer ceramic capacitor 10. FIG. 3 is a cross-sectional view of the multi-layer ceramic capacitor 10 taken along the A-A' line in FIG. 1. FIG. 4 is a cross-sectional view of the multi-layer ceramic capacitor 10 taken along the B-B' line in FIG. 1.

The multi-layer ceramic capacitor 10 includes the ceramic body 11, a first external electrode 14, and a second external electrode 15. Typically, the ceramic body 11 is formed as a hexahedron having two end surfaces facing in the X-axis direction, two side surfaces S facing in the Y-axis direction, and two main surfaces facing in the Z-axis direction. The ceramic body 11 has eight corner portions C11 at respective vertices of the hexahedron. Ridges connecting the surfaces of the ceramic body 11 and the corner portions C11 are rounded.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 may not extend to any of the main surfaces and the side surfaces.

The first and second external electrodes 14 and 15 are each made of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is made of dielectric ceramics and includes a multi-layer unit 16 and side margins 17. The multi-layer unit 16 has two end surfaces T1 and T2 facing in the X-axis direction, two side surfaces S1 and S2 facing in the Y-axis direction, and two main surfaces M1 and M2 facing in the Z-axis direction. The multi-layer unit 16 has a configuration in which a plurality of flat plate-like ceramic layers extending along the X-Y plane are laminated in the Z-axis direction. The side margins 17 are formed on both the side surfaces S1 and S2 of the multi-layer unit 16.

The multi-layer unit 16 includes a capacitance forming unit 18, drawn portions 19, and covers 20. The capacitance forming unit 18 includes a plurality of first internal electrodes 12 and a plurality of second internal electrodes 13 that are covered with dielectric ceramics. The first and second internal electrodes 12 and 13 each have a sheet-like shape extending along the X-Y plane. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

As shown in FIG. 4, the first and second internal electrodes 12 and 13 are formed over the entire width of the capacitance forming unit 18 in the Y-axis direction, and both end portions thereof are disposed on the side surfaces S1 and S2 of the multi-layer unit 16. In this embodiment, the side margins 17 are provided, in a later step, to the multi-layer unit 16 in which the first and second internal electrodes 12 and 13 in the capacitance forming unit 18 are exposed on both the side surfaces S1 and S2, which will be described later in detail. Thus, in the capacitance forming unit 18, the positions of the end portions of the first and second internal electrodes 12 and 13 in the Y-axis direction are aligned with one another in the range of 0.5 μm in the Y-axis direction.

The drawn portions 19 are disposed on both sides of the capacitance forming unit 18 in the X-axis direction. The first internal electrodes 12 of the capacitance forming unit 18 are drawn to the drawn portion 19 on the end surface T1 side and are connected to the first external electrode 14 on the end surface T1 via the end portions of the first internal electrodes 12. Meanwhile, the second internal electrodes 13 of the capacitance forming unit 18 are drawn to the drawn portion 19 on the end surface T2 side and are connected to the second external electrode 15 on the end surface T2 via the end portions of the second internal electrodes 13.

The ceramic layers between the first internal electrodes 12 in the drawn portion 19 on the end surface T1 side function as an end margin for ensuring the insulation properties between the second internal electrodes 13 and the first external electrode 14. Similarly, the ceramic layers between the second internal electrodes 13 in the drawn portion 19 on the end surface T2 side function as an end margin for ensuring the insulation properties between the first internal electrodes 12 and the second external electrode 15.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. Thus, the multi-layer ceramic capacitor 10 stores charge corresponding to the voltage applied between the first external electrode 14 and the second external electrode 15.

The covers 20 cover the capacitance forming unit 18 and the drawn portions 19 in the Z-axis direction from above and below. Thus, an upper surface M3 and a bottom surface M4 are each formed between the cover 20, and the capacitance forming unit 18 and drawn portions 19. Further, the outer surfaces of the covers 20 in the Z-axis direction are the two main surfaces M1 and M2 of the multi-layer unit 16.

In the capacitance forming unit 18, the surfaces excluding both the end surfaces, which face in the X-axis direction and to which the drawn portions 19 are provided, are covered with the side margins 17 and the covers 20. Further, in the drawn portions 19, the surfaces excluding both the end surfaces, which face in the X-axis direction and to which the first and second external electrodes 14 and 15 are provided, and excluding the surfaces connected to the capacitance forming unit 18, are covered with the side margins 17 and the covers 20. Therefore, in the capacitance forming unit 18 and the drawn portions 19, the periphery thereof is protected by the side margins 17 and the covers 20, and insulation properties of the first and second internal electrodes 12 and 13 are ensured.

In the multi-layer ceramic capacitor 10 according to this embodiment, when the thickness of the cover 20 (dimension in the Z-axis direction) and the thickness of the side margin 17 (dimension in the Y-axis direction) are reduced, the capacitance forming unit 18 can be enlarged. With this configuration, a large capacitance is obtained in the multi-layer ceramic capacitor 10. Specifically, the thickness of the cover 20 and that of the side margin 17 in the multi-layer ceramic capacitor 10 are each less than 20 μm.

Further, in the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The first and second internal electrodes 12 and 13 are each made of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that the multi-layer ceramic capacitor 10 according to this embodiment only needs to include the multi-layer unit 16 and the side margins 17, and other configurations of the multi-layer ceramic capacitor 10 can be changed as appropriate. For example, the number of first and second internal electrodes 12 and 13 can be determined as appropriate according to the size and performance expected for the multi-layer ceramic capacitor 10.

2. Configuration of Drawn Portion 19

The configuration of the drawn portion 19 will be described with reference to FIGS. 5 to 8. It should be noted that FIGS. 5 to 8 show only the configuration of the drawn portion 19 on the end surface T1 side of the multi-layer unit 16. The drawn portion 19 on the end surface T2 side, which is opposite to the end surface T1 side in the X-axis direction, has a configuration similar to that of the drawn portion 19 on the end surface T1 side except that the second internal electrodes 13 are drawn instead of the first internal electrodes 12, and thus description thereof will be omitted.

2.1 Schematic Configuration

Figure 5:
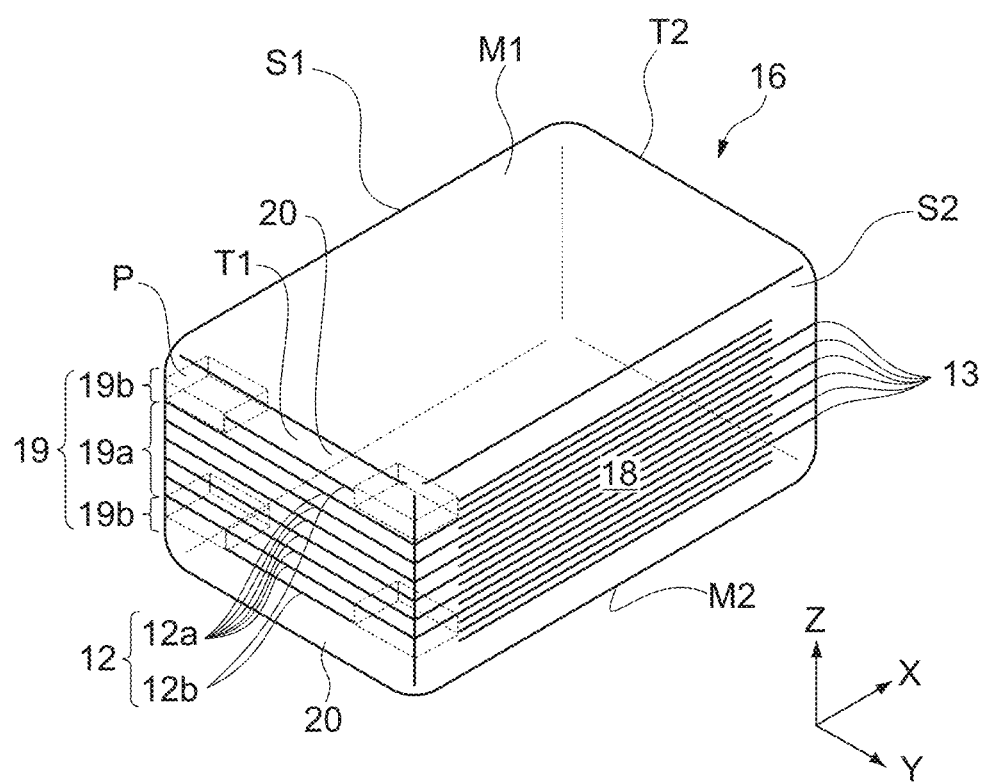
FIG. 5 is a perspective view of a multi-layer unit of the multi-layer ceramic capacitor.

FIG. 5 is a perspective view of the multi-layer unit 16. As shown in FIG. 5, in the drawn portion 19 on the end surface T1 side of the multi-layer unit 16, as will be described in detail in the section of "Detailed Configuration", end portions of each internal electrode 12b in the Y-axis direction, the internal electrode 12b being located in a second region 19b of the drawn portion 19, are positioned inward in the Y-axis direction relative to end portions of each internal electrode 12a in the Y-axis direction, the internal electrode 12a being located in a first region 19a of the drawn portion 19. With this configuration, four regions P each having a substantially rectangular parallelepiped shape and including no first internal electrodes 12 are formed in the second regions 19b on the end surface T1 side and the end surface T2 side.

The inside of each region P is made of the same type of ceramic material as that of the ceramic layers and the side margins 17. Accordingly, at the eight corner portions C11 of the ceramic body 11, a distance between the outside and each of the first and second internal electrodes 12 and 13 can be sufficiently ensured. With this configuration, in the multi-layer ceramic capacitor 10, even when the thickness of the cover 20 and that of the side margin 17 are reduced to be less than 20 μm, high moisture resistance can be obtained.

The regions P are formed only at the eight corner portions of the hexahedral portion excluding the covers 20 of the multi-layer unit 16. In other words, the regions P are formed only in the vicinity of the eight corner portions C11 of the ceramic body 11, in which the side margins 17 are particularly likely to be thin. With this configuration, when the region P necessary to ensure moisture resistance is limited to the minimum, the intersectional area can be ensured without affecting the capacitance forming unit 18. Therefore, the multi-layer ceramic capacitor 10 can have high moisture resistance and ensure a large capacitance.

Additionally, when the region P is limited to the minimum as described above, a contact area between the end portion of the first internal electrode 12 and the first external electrode 14 can be ensured. With this configuration, the first internal electrode 12 and the first external electrode 14 can be successfully electrically connected to each other.

2.2 Detailed Configuration

Figure 6:
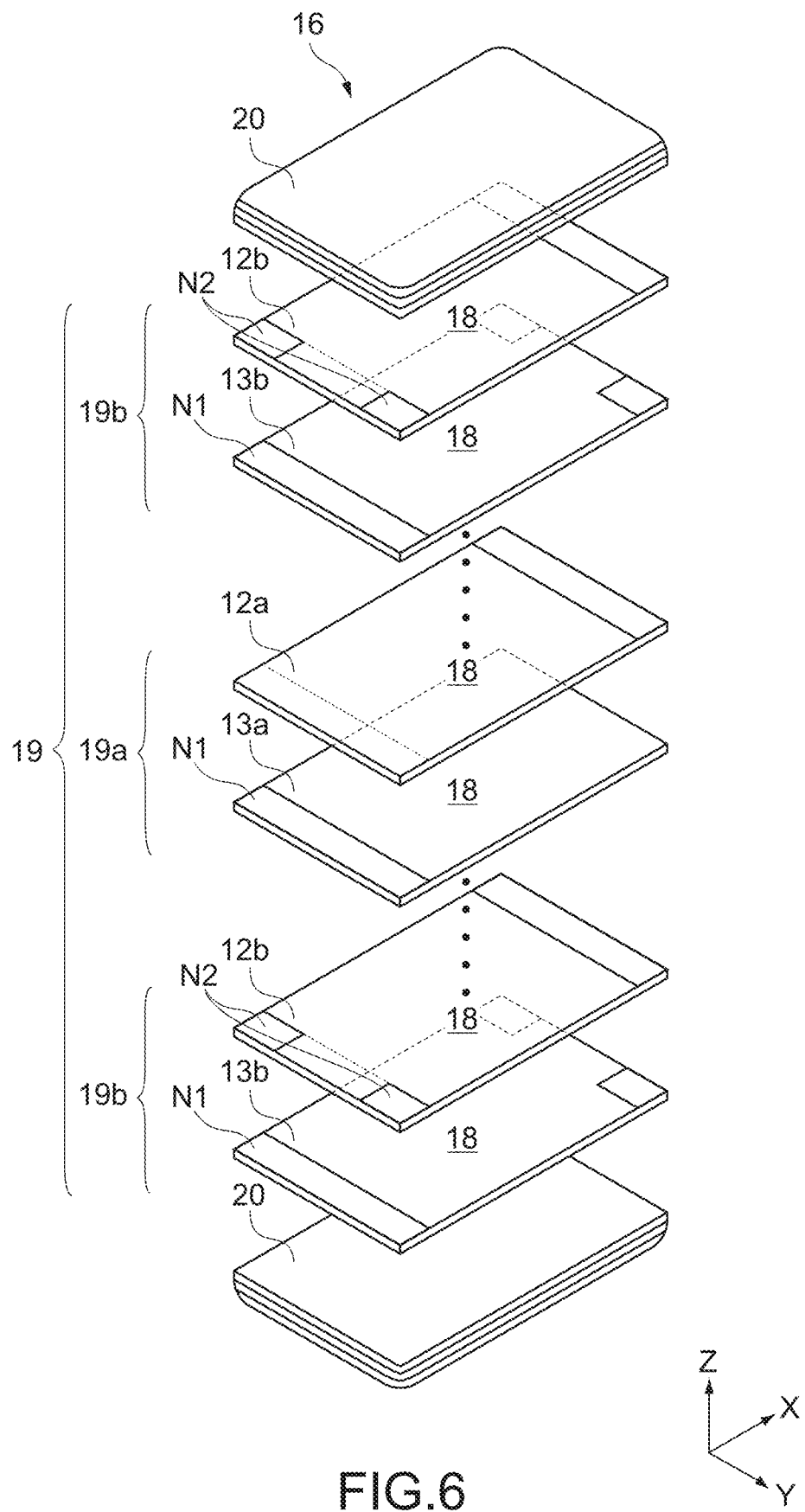
FIG. 6 is an exploded perspective view of the multi-layer unit of the multi-layer ceramic capacitor.
Figure 7:
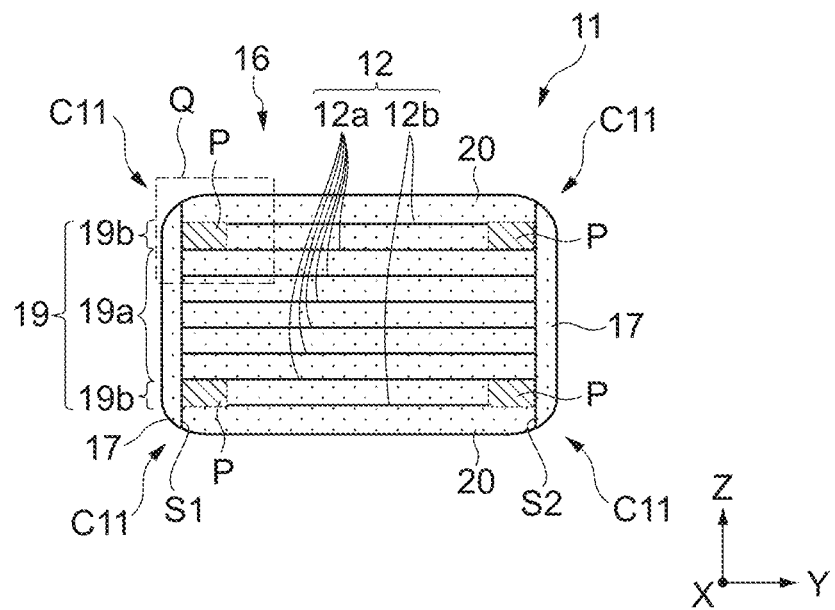
FIG. 7 is a cross-sectional view of the multi-layer ceramic capacitor taken along the C-C' line in FIG. 2.

FIG. 6 is an exploded perspective view of the multi-layer unit 16, in which the multi-layer unit 16 shown in FIG. 5 is exploded in the Z-axis direction. FIG. 7 is a cross-sectional view of the multi-layer ceramic capacitor 10 taken along the C-C' line in FIG. 2.

As shown in FIG. 7, the drawn portion 19 includes the first region 19a and the second regions 19b. The first region 19a is disposed at the center portion of the drawn portion 19 in the Z-axis direction. The second region 19b is disposed between the first region 19a and each of the upper and lower covers 20 disposed in the Z-axis direction.

Further, as shown in FIG. 6, the first region 19a has a structure in which a layer on which the internal electrode 12a drawn to the end surface T1 side is formed, and a layer on which an internal electrode 13a drawn to the end surface T2 side is formed are alternately laminated. The layer on which the internal electrode 13a is formed includes an electrode non-formation region N1 extending along the X-Y plane on the entire first region 19a on the end surface T1 side. The electrode non-formation region N1 functions as an end margin for insulating the internal electrode 13a and the first external electrode 14 from each other. When a plurality of layers described above are laminated, the first region 19a that is to be the center portion of the drawn portion 19 in the Z-axis direction is formed as shown in FIG. 7.

The second region 19b has a structure in which a layer on which the internal electrode 12b drawn to the end surface T1 side is formed, and a layer on which an internal electrode 13b drawn to the end surface T2 side is formed are alternately laminated. The layer on which the internal electrode 12b is formed includes electrode non-formation regions N2, which are formed at the end portions in the Y-axis direction and each have a substantially rectangular shape extending along the X-Y plane. The internal electrode 12b drawn to the end surface T1 side has a shape narrowed in the Y-axis direction by the electrode non-formation regions N2. Further, the internal electrode 13b drawn to the end surface T2 side also has a configuration similar to that described above, and includes an electrode non-formation region N1, which extends along the X-Y plane, over the entire second region 19b on the end surface T1 side.

When a plurality of layers described above are laminated, as shown in FIG. 7, the two second regions 19b are formed between the first region 19a and the respective covers 20. It should be noted that in the example shown in FIG. 6, the single internal electrode 12a and the single internal electrode 13a are laminated as the layer forming the first region 19a, but the number of internal electrodes 12a and 13a can be changed as appropriate. Similarly, the single internal electrode 12b and the single internal electrode 13b are laminated as the layer forming the second regions 19b disposed on each of the upper side and the lower side of the first region 19a in the Z-axis direction, but the number of internal electrodes 12b and 13b can be changed as appropriate.

In the second region 19b, the layer including the electrode non-formation region N1 and the layer including the electrode non-formation regions N2 are alternately laminated as described above. As shown in FIG. 7, an end portion of the internal electrode 12b in the Y-axis direction, the internal electrode 12b being located in the second region 19b, is positioned inward in the Y-axis direction relative to an end portion of the internal electrode 12a in the Y-axis direction, the internal electrode 12a being located in the first region 19a. With this configuration, a region P having a substantially rectangular parallelepiped shape, in which at least one layer of the internal electrode 12b is not disposed, is formed in a region surrounded by the end portion of the internal electrode 12b in the Y-axis direction, the internal electrode 12b being located in the second region 19b, the outermost layer (uppermost layer or lowermost layer) of the internal electrode 12a located in the first region 19a, the side margin 17, and the cover 20. The regions P are formed at the eight corner portions of the hexahedral portion excluding the covers 20 of the multi-layer unit 16, in the second regions 19b on the end surface T1 side and the end surface T2 side.

Figure 8:
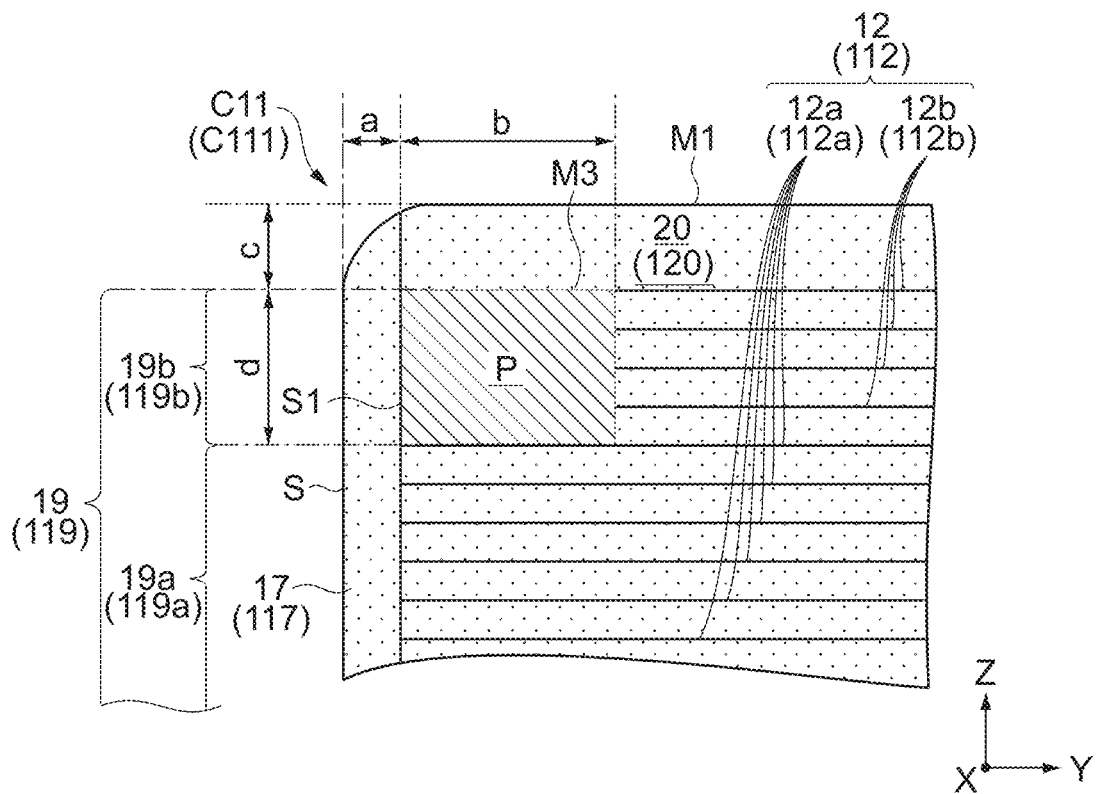
FIG. 8 is an enlarged cross-sectional view of a region of the multi-layer ceramic capacitor, the region being denoted by Q in FIG. 7.

FIG. 8 is an enlarged cross-sectional view of a region Q, which is surrounded by a broken line in FIG. 7. Further, FIG. 8 also serves as an enlarged cross-sectional view of FIG. 18 to be described later. FIG. 8 shows dimensions "a" to "d" and it is favorable that the ratios and values of the dimensions "a" to "d" satisfy predetermined relationships. The dimension "a" is the thickness (dimension in the Y-axis direction) of the side margin 17 that covers the multi-layer unit 16 in the Y-axis direction. As described above, the dimension "a" is less than 20 The dimension "b" is a value corresponding to a distance in the Y-axis direction between the end portion of the internal electrode 12b in the Y-axis direction, the internal electrode 12b being located in the second region 19b, and the end portion of the internal electrode 12a in the Y-axis direction, the internal electrode 12a being located in the first region 19a. With this configuration, a favorable shape of the region P is defined.

The thickness of the side margin 17 that covers the multi-layer unit 16 in the Y-axis direction is likely to be thin particularly at the corner portion C11 of the ceramic body 11. Thus, in order to ensure the distance from the outside of the ceramic body 11 to each of the internal electrodes 12a and 12b, it is favorable that the configuration in the vicinity of the corner portion C11 satisfies conditions of b≥5 and a+b≥15 The region P that satisfies those conditions can inhibit the internal electrodes 12a and 12b to be exposed to the outside and enables the moisture resistance of the multi-layer ceramic capacitor 10 to be improved.

Additionally, it is more favorable that the region P satisfies a condition of b≤2.5a. The region P that satisfies that condition can maintain the intersectional area of the capacitance forming unit 18 and improve the moisture resistance. With this configuration, the multi-layer ceramic capacitor 10 can have high moisture resistance and ensure a large capacitance.

Further, the dimension "c" is the thickness (dimension in the Z-axis direction) of the cover 20 that covers the capacitance forming unit 18 and the drawn portion 19 in the Z-axis direction. As described above, the dimension "c" is less than 20 The dimension "d" is a value corresponding to a distance in the Z-axis direction between the internal electrode 12a disposed on the outermost layer (uppermost layer or lowermost layer) in the first region 19a and the internal electrode 12b disposed on the outermost layer (uppermost layer or lowermost layer) in the second region 19b. With this configuration, a favorable shape of the region P is defined.

The thickness of the cover 20 that covers the capacitance forming unit 18 and the drawn portion 19 in the Z-axis direction is likely to be thin particularly at the corner portion C11 of the ceramic body 11. Thus, in order to ensure the distance from the outside of the ceramic body 11 to each of the internal electrodes 12a and 12b, it is favorable that the configuration in the vicinity of the corner portion C11 satisfies conditions of d≥5 μm, and c+d≥15 μm. The region P that satisfies those conditions can inhibit the internal electrodes 12a and 12b to be exposed to the outside and enables the moisture resistance of the multi-layer ceramic capacitor 10 to be improved.

Additionally, it is more favorable that the region P satisfies a condition of d≤2.5c. The region P that satisfies that condition can maintain the intersectional area of the capacitance forming unit 18 and enables the moisture resistance to be improved. With this configuration, the multi-layer ceramic capacitor 10 can have high moisture resistance and ensure a large capacitance.

3. Method of Producing Multi-Layer Ceramic Capacitor 10

Figure 9:
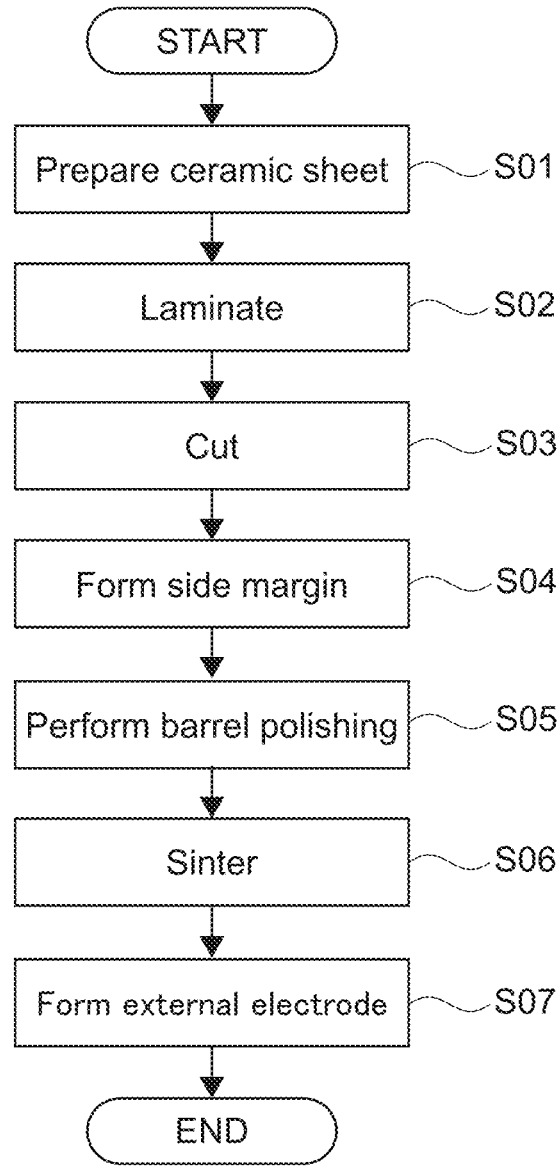
FIG. 9 is a flowchart showing a method of producing the multi-layer ceramic capacitor.
Figure 10:
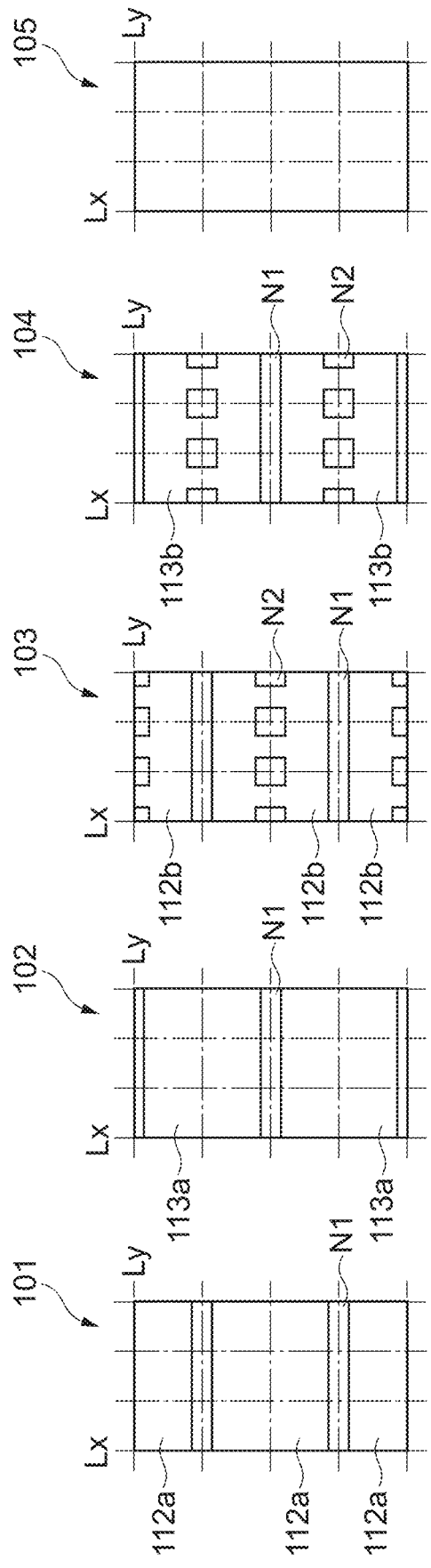
FIGS. 10A, 10B, 10C, 10D, and 10E are each a plan view showing a production process of the multi-layer ceramic capacitor.

FIG. 9 is a flowchart showing a method of producing the multi-layer ceramic capacitor 10. FIGS. 10A to 18 are views each showing a production process of the multi-layer ceramic capacitor 10. Hereinafter, the method of producing the multi-layer ceramic capacitor 10 will be described according to FIG. 9 with reference to FIGS. 10A to 18 as appropriate.

3.1 Step S01: Preparation of Ceramic Sheet

In Step S01, first ceramic sheets 101 and second ceramic sheets 102 for forming the capacitance forming unit 18 and the first region 19a of the drawn portion 19, third ceramic sheets 103 and fourth ceramic sheets 104 for forming the capacitance forming unit 18 and the second regions 19b of the drawn portion 19, and fifth ceramic sheets 105 for forming the covers 20 are prepared. The first to fifth ceramic sheets 101 to 105 mainly contain insulating ceramics and are formed as unsintered dielectric green sheets. The first to fifth ceramic sheets 101 to 105 are each formed into a sheet by using, for example, a roll coater or a doctor blade.

FIGS. 10A, 10B, 10C, 10D, and 10E are plan views of the first, second, third, fourth, and fifth ceramic sheets 101, 102, 103, 104, and 105, respectively. At this stage, the first to fifth ceramic sheets 101 to 105 are not singulated into the multi-layer ceramic capacitors 10. FIGS. 10A to 10E each show cutting lines Lx and Ly to be used when the sheets are singulated into the multi-layer ceramic capacitors 10. The cutting lines Lx are parallel to the X axis, and the cutting lines Ly are parallel to the Y axis.

As shown in FIGS. 10A to 10E, unsintered internal electrodes 112a corresponding to the internal electrodes 12a are formed on the first ceramic sheet 101, unsintered internal electrodes 113a corresponding to the internal electrodes 13a are formed on the second ceramic sheet 102, unsintered internal electrodes 112b corresponding to the internal electrodes 12b are formed on the third ceramic sheet 103, and unsintered internal electrodes 113b corresponding to the internal electrodes 13b are formed on the fourth ceramic sheet 104. It should be noted that no internal electrodes are formed on the fifth ceramic sheet 105 corresponding to the cover 20.

The internal electrodes 112a, 113a, 112b, and 113b can be formed by, for example, applying an electrically conductive paste containing nickel (Ni). For the formation of the internal electrodes 112a, 113a, 112b, and 113b by using an electrically conductive paste, for example, a screen printing method or a gravure printing method can be used.

The internal electrodes 112a, 113a, 112b, and 113b and the electrode non-formation regions N1 are each disposed over two regions that are adjacent to each other in the X-axis direction and divided by the cutting line Ly, and each extend in the Y-axis direction in a belt-like shape. The electrode non-formation regions N2 are disposed along the Y-axis direction at predetermined intervals.

The internal electrode 112a disposed on the first ceramic sheet 101 and the internal electrode 112b disposed on the third ceramic sheet 103 are displaced from the internal electrode 113a disposed on the second ceramic sheet 102 and the internal electrode 113b disposed on the fourth ceramic sheet 104, in the X-axis direction by one row including the regions divided by the cutting lines Ly. In other words, the cutting line Ly passing through the center of the internal electrode 112a and the center of the internal electrode 112b passes through a region between the internal electrodes 113a and a region between the internal electrodes 113b, and the cutting line Ly passing through the center of the internal electrode 113a and the center of the internal electrode 113b passes through a region between the internal electrodes 112a and a region between the internal electrodes 112b.

The electrode non-formation regions N1 disposed on the first to fourth ceramic sheets 101 to 104 are displaced in the X-axis direction by one row including the regions divided by the cutting lines Ly. Similarly, the electrode non-formation regions N2 disposed on the third and fourth ceramic sheets 103 and 104 are displaced in the X-axis direction by one row including the regions divided by the cutting lines Ly.

3.2 Step S02: Lamination

In Step S02, the first to fifth ceramic sheets 101 to 105 prepared in Step S01 are laminated to produce a multi-layer sheet 106.

Figure 11:
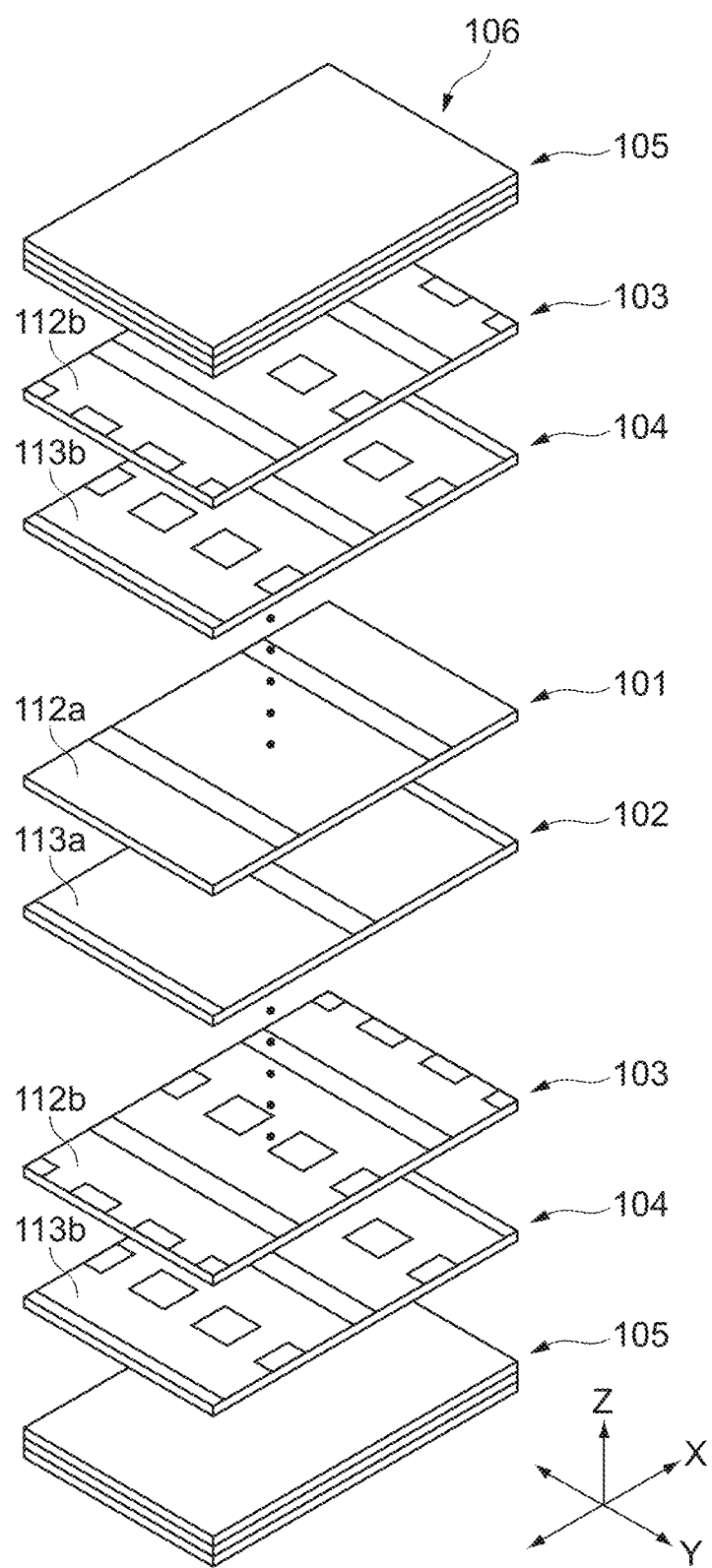
FIG. 11 is a perspective view showing a production process of the multi-layer ceramic capacitor.

FIG. 11 is an exploded perspective view of the multi-layer sheet 106 obtained in Step S02. FIG. 11 shows the first to fifth ceramic sheets 101 to 105 in an exploded manner for the purpose of description. However, in the actual multi-layer sheet 106, the first to fifth ceramic sheets 101 to 105 are pressure-bonded and integrated by hydrostatic pressing, uniaxial pressing, or the like.

In the multi-layer sheet 106, the first to fifth ceramic sheets 101 to 105 corresponding to the capacitance forming unit 18 and the drawn portions 19 are laminated in the Z-axis direction. Specifically, the first ceramic sheets 101 and the second ceramic sheets 102 corresponding to the capacitance forming unit 18 and the first regions 19a of the drawn portions 19 are alternately laminated in the Z-axis direction at the center portion of the multi-layer sheet 106 in the Z-axis direction. The third ceramic sheets 103 and the fourth ceramic sheets 104 corresponding to the capacitance forming unit 18 and the second regions 19b of the drawn portions 19 are alternately laminated in the Z-axis direction on each of the upper and lower surfaces of the center portion of the multi-layer sheet 106 in the Z-axis direction.

Further, in the multi-layer sheet 106, the electrode non-formation regions N1 formed on the first ceramic sheet 101 and the electrode non-formation regions N1 formed on the second ceramic sheet 102 are alternately disposed in the X-axis direction. In other words, the internal electrodes 112a and the internal electrodes 113a, which are located in two first regions 119a on the end surface T1 side and the end surface T2 side, respectively, are alternately disposed in the X-axis direction.

Additionally, in the multi-layer sheet 106, the electrode non-formation regions N1 formed on the third ceramic sheet 103 and the electrode non-formation regions N1 formed on the fourth ceramic sheet 104 are alternately disposed in the X-axis direction. Similarly, the electrode non-formation regions N2 formed on the third ceramic sheet 103 and the electrode non-formation regions N2 formed on the fourth ceramic sheet 104 are alternately disposed in the X-axis direction. In other words, the internal electrodes 112b and the internal electrodes 113b, which are located in two second regions 119b on the end surface T1 side and the end surface T2 side, respectively, are alternately disposed in the X-axis direction.

It should be noted that in the example of FIG. 11, the single first ceramic sheet 101 the single second ceramic sheet 102 are laminated, but the number of first ceramic sheets 101 and second ceramic sheets 102 can be changed as appropriate. Similarly, the two third ceramic sheets 103 and the two fourth ceramic sheets 104 are laminated, but the number of third ceramic sheets 103 and fourth ceramic sheets 104 can be changed as appropriate.

Further, in the multi-layer sheet 106, the fifth ceramic sheets 105 corresponding to the covers 20 are laminated as the outermost layers. It should be noted that in the example shown in FIG. 11, the three fifth ceramic sheets 105 are laminated to correspond to the cover 20 on each side, but the number of fifth ceramic sheets 105 can be changed as appropriate such that the thickness of the cover 20 after sintering is less than 20 µm.

3.3 Step S03: Cutting

In Step S03, the multi-layer sheet 106 obtained in Step S02 is cut with a rotary blade, a push-cutting blade, or the like to produce an unsintered multi-layer unit 116.

Figure 12:
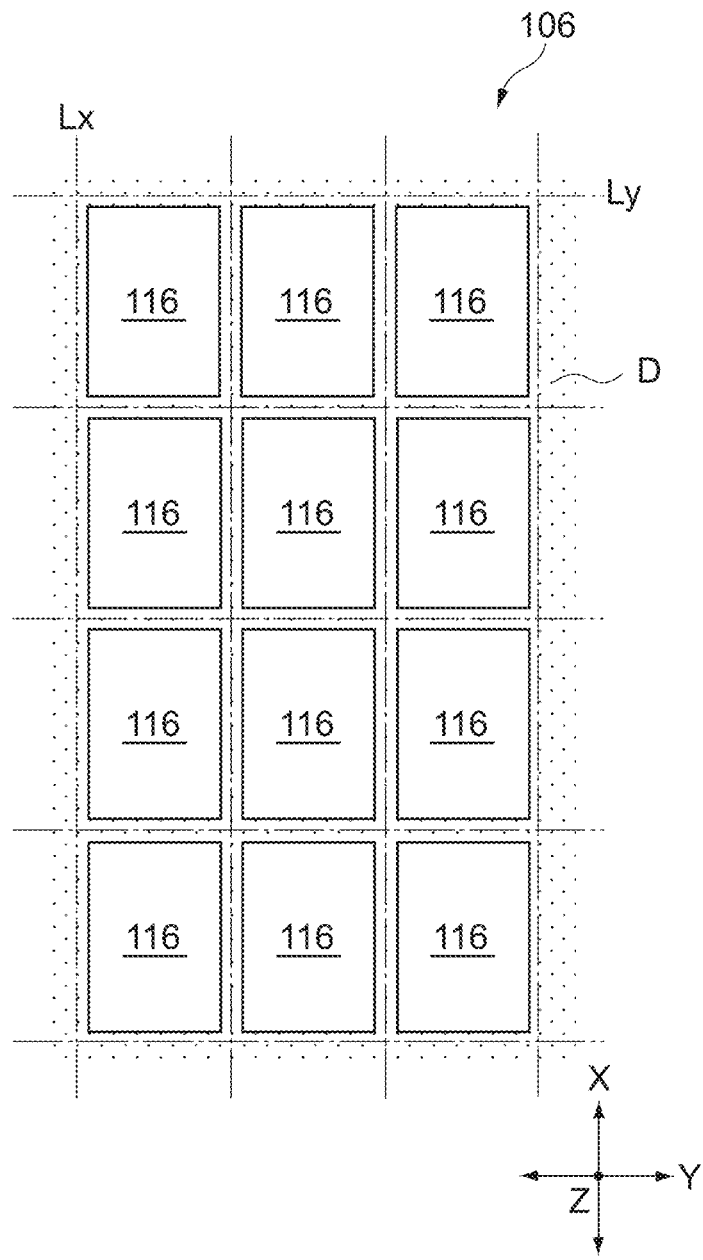
FIG. 12 is a schematic view showing a production process of the multi-layer ceramic capacitor.

FIG. 12 is a plan view of the multi-layer sheet 106 obtained after Step S03. The multi-layer sheet 106 is cut along the cutting lines Lx and Ly while being fixed to a holding member D. Accordingly, the multi-layer sheet 106 is singulated, so that the multi-layer units 116 are obtained. At that time, the holding member D is not cut, and thus the multi-layer units 116 are connected via the holding member D.

Figure 13:
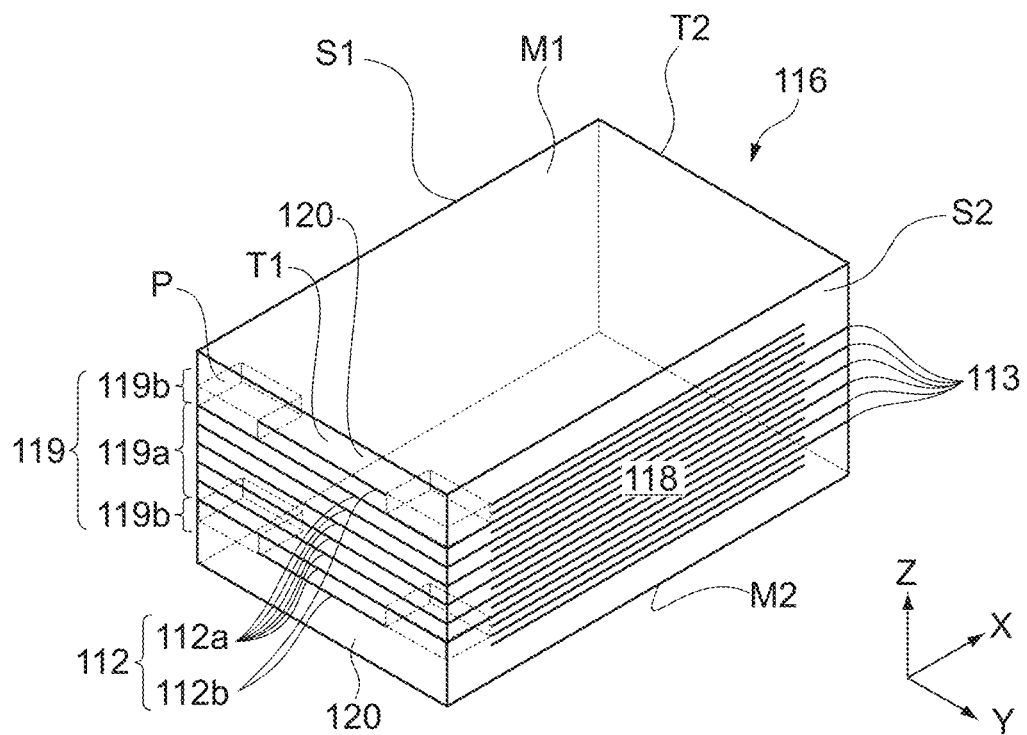
FIG. 13 is a perspective view showing a production process of the multi-layer ceramic capacitor.

FIG. 13 is a perspective view of the multi-layer unit 116 obtained in Step S03. The multi-layer unit 116 includes an unsintered capacitance forming unit 118, unsintered drawn portions 119 each including the first region 119a and the second regions 119b, and unsintered covers 120. In the multi-layer chip 116, unsintered first and second internal electrodes 112 and 113 are exposed on the cut surfaces, i.e., both side surfaces S1 and S2 facing in the Y-axis direction. Further, the end portions of the unsintered internal electrodes 112a and 112b are exposed on the end surface T1 that is the cut surface and faces in the X-axis direction, and the end portions of the unsintered internal electrodes 113a and 113b are exposed on the end surface T2 that is the cut surface and faces in the X-axis direction.

In both the end portions of the second region 119b in the Y-axis direction, the regions P in each of which the internal electrodes 112b and 113b are not disposed are formed by patterning the internal electrodes 112b and 113b as described above. It should be noted that in the example shown in FIG. 13, only the four regions P on the end surface T1 side are shown, but the regions P are formed at all of the eight corner portions excluding the covers 120 of the unsintered multi-layer unit 116.

3.4 Step S04: Formation of Side Margin

In Step S04, unsintered side margins 117 are provided to the side surfaces S1 and S2 of the multi-layer unit 116, to produce an unsintered ceramic body 111. Hereinafter, description will be given on an example of a method of providing the unsintered side margins 117 to the side surfaces S1 and S2 of the multi-layer unit 116.

In Step S04, in order to provide the side margins 117 to the side surfaces S1 and S2 of the multi-layer unit 116, the orientation of the multi-layer unit 116 is changed as appropriate by replacement of the holding member such as a tape.

In particular, in Step S04, the side margins 117 are provided to the side surfaces S1 and S2 that are the cut surfaces of the multi-layer unit 116 obtained in Step S03 and face in the Y-axis direction. Thus, in Step S04, it is favorable to detach the multi-layer unit 116 from the holding member D in advance and rotate the multi-layer unit 116 by 90 degrees.

Figure 14:
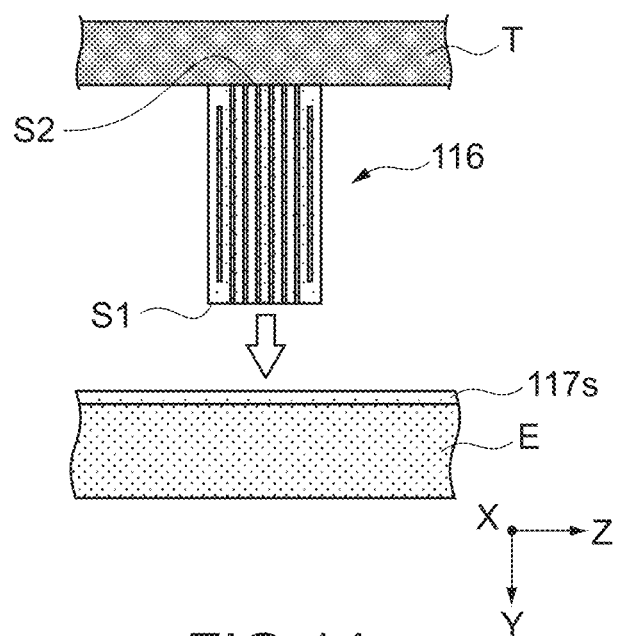
FIG. 14 is a schematic view showing a production process of the multi-layer ceramic capacitor.
Figure 15:
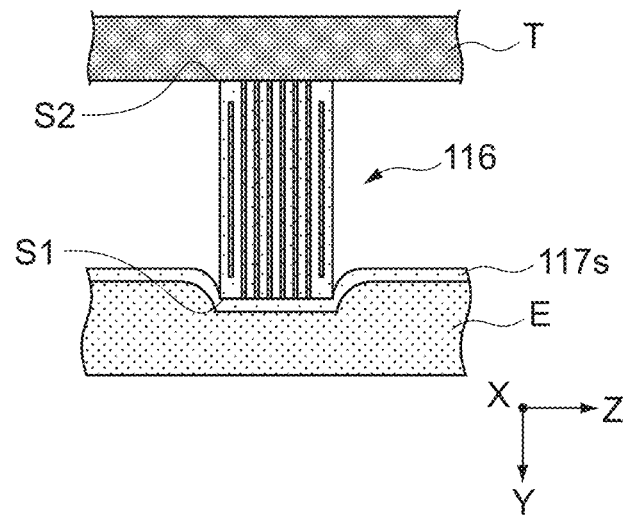
FIG. 15 is a schematic view showing a production process of the multi-layer ceramic capacitor.
Figure 16:
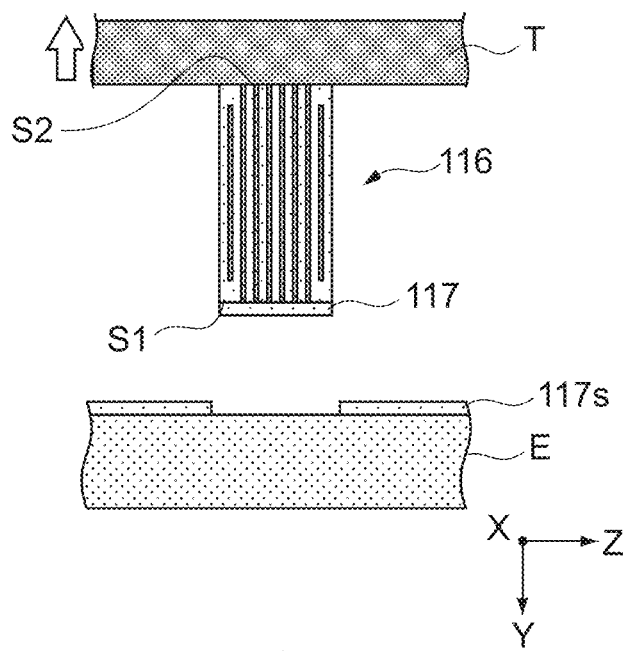
FIG. 16 is a schematic view showing a production process of the multi-layer ceramic capacitor.

FIGS. 14 to 16 are schematic views each showing the process of Step S04 and showing a state where a side margin sheet 117s is punched by the multi-layer unit 116. Hereinafter, the process of Step S04 will be described in sequence.

First, as shown in FIG. 14, one side surface S1 of the multi-layer unit 116, the other side surface S2 of which is held with a tape T, is caused to face the side margin sheet 117s disposed on a flat plate-like elastic body E. The side margin sheet 117s is formed as a large-sized dielectric green sheet for forming the unsintered side margins 117.

The thickness of the side margin 17 obtained after sintering is adjustable to be less than 20 µm by the thickness of the side margin sheet 117s. The side margin sheet 117s is formed into a sheet by using, for example, a roll coater or a doctor blade, and the thickness thereof can thus be accurately controlled.

Next, as shown in FIG. 15, the side surface S1 of the multi-layer unit 116 is pressed against the side margin sheet 117s and the multi-layer unit 116 is caused to sink into the elastic body E together with the side margin sheet 117s. At that time, only a region of the side margin sheet 117s, which is pressed by the multi-layer unit 116, is cut off by a shear force applied from the elastic body E.

When the multi-layer unit 116 is moved so as to separate from the elastic body E as shown in FIG. 16, only the part of the side margin sheet 117s, which is attached to the side surface S1 of the multi-layer unit 116, separates from the elastic body E. Thus, the side margin 117 is formed on the side surface S1 of the multi-layer unit 116.

Subsequently, the orientation of the multi-layer unit 116 in the Y-axis direction is inverted by transferring the multi-layer unit 116 shown in FIG. 16 to a different tape T. In the manner similar to the above, the side margin 117 is formed also on the side surface S2 on the other side of the multi-layer unit 116, on which the side margin 117 is not formed.

Figure 17:
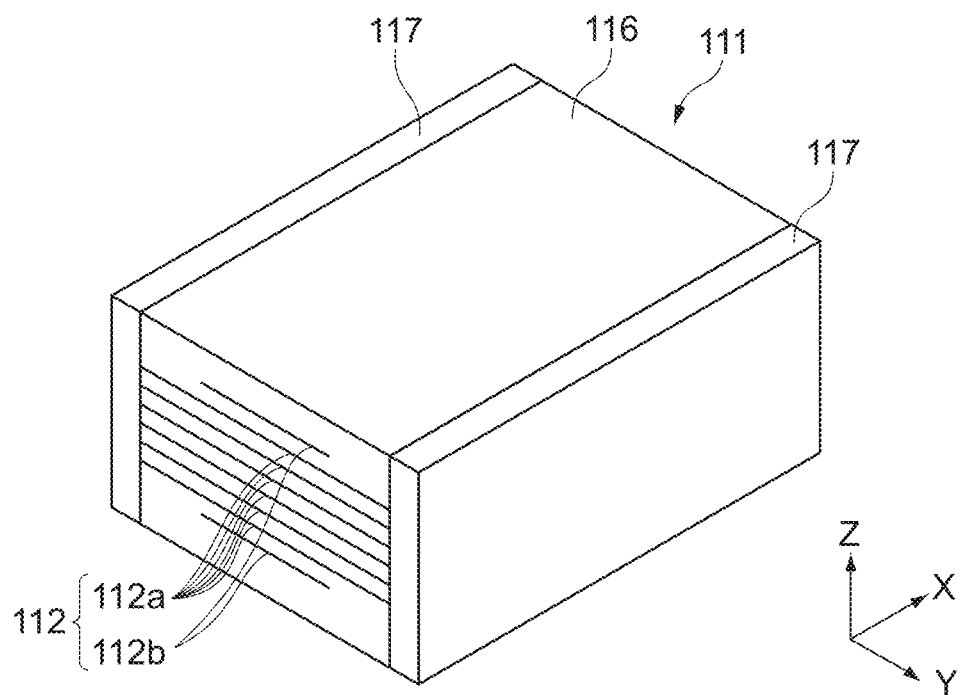
FIG. 17 is a perspective view showing a production process of the multi-layer ceramic capacitor.

Thus, as shown in FIG. 17, the unsintered ceramic body 111 in which the side margins 117 are formed on the side surfaces S1 and S2 of the multi-layer unit 116 is obtained. In the unsintered ceramic body 111, the side surfaces S1 and S2 of the multi-layer unit 116, from which the internal electrodes 112 and 113 are exposed, are covered with the side margins 117.

It should be noted that the method of forming the side margins 117 on the side surfaces S1 and S2 of the multi-layer unit 116 is not limited to the above method of punching the side margin sheet 117s. For example, the side margin sheets 117s cut in advance may be attached to the side surfaces S1 and S2 of the multi-layer unit 116 to form the side margins 117.

Alternatively, the method of forming the side margins 117 on the side surfaces S1 and S2 of the multi-layer unit 116 may be a dip method, in which one of the side surfaces of the multi-layer unit 116 is immersed into ceramic slurry and then pulled up. Thus, the ceramic slurry adheres to the one side surface of the multi-layer unit 116, thus forming the side margin 117. Subsequently, the side margin 117 is formed also on the other side surface of the multi-layer unit 116 in the manner similar to the above.

3.5 Step S05: Barrel Polishing

In Step S05, the unsintered ceramic body 111 obtained in Step S04 is chamfered by barrel polishing. The barrel polishing performed in Step S05 can be executed by, for example, putting the plurality of unsintered ceramic bodies 111, a polishing medium, and liquid into a barrel container, sealing it, and imparting rotational motions or vibrations to the barrel container.

Figure 18:
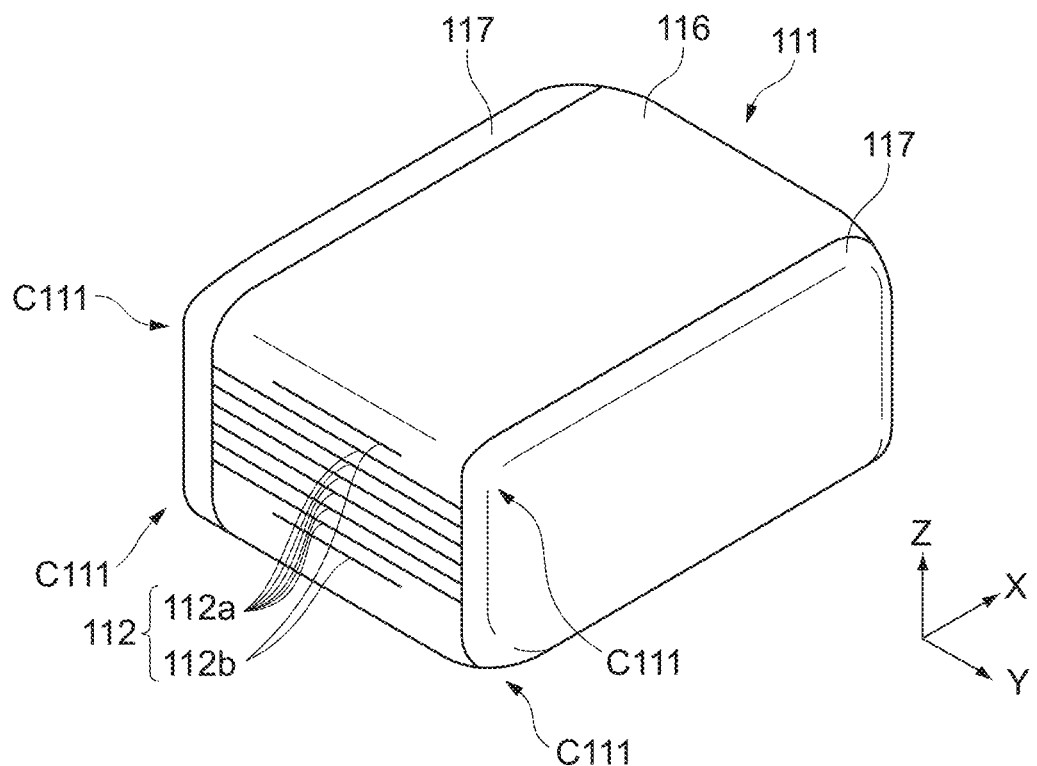
FIG. 18 is a perspective view showing a production process of the multi-layer ceramic capacitor.

FIG. 18 is a view of the unsintered ceramic body 111 obtained after the barrel polishing. By the barrel polishing, a plurality of corner portions C111 positioned at respective vertices of the hexahedron of the unsintered ceramic body 111 and the ridges connecting the plurality of corner portions C111 are chamfered to be rounded as shown in FIG. 18.

3.6 Step S06: Sintering

In Step S06, the unsintered ceramic body 111 obtained in Step S05 is sintered to produce the ceramic body 11 of the multi-layer ceramic capacitor 10 shown in FIGS. 1 to 4. In other words, in Step S06, the multi-layer unit 116 becomes the multi-layer unit 16, and the side margins 117 become the side margins 17.

A sintering temperature in Step S06 can be determined on the basis of a sintering temperature for the ceramic body 111. For example, when a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

3.7 Step S07: Formation of External Electrode

In Step S07, the first external electrode 14 and the second external electrode 15 are formed at both the end portions of the ceramic body 11 in the X-axis direction obtained in Step S06, to produce the multi-layer ceramic capacitor 10 shown in FIGS. 1 and 3. A method of forming the first external electrode 14 and the second external electrode 15 in Step S07 is optionally selectable from publicly known methods. Further, the first external electrode 14 and the second external electrode 15 may be sintered simultaneously with the unsintered ceramic body 111. In other words, after Step S05, unsintered external electrodes can be formed at both the end portions of the unsintered ceramic body 111 in the X-axis direction and then sintered simultaneously with the unsintered ceramic body 111 in Step S06, to form the first external electrode 14 and the second external electrode 15.

3.8 Action and Effect of Embodiment

In this embodiment, the internal electrodes 112a, 113a, 112b, and 113b on the first to fourth ceramic sheets 101 to 104 are patterned, and thus the regions P in each of which the internal electrodes 112 and 113 are not disposed are formed at both the end portions in the Y-axis direction of the second region 119b of the drawn portion 119.

In general, in the process of providing the side margins in a later step, since the multi-layer unit is pressure-bonded in Step S02 (Lamination), the density of the side margins is lower than that of the multi-layer unit. Accordingly, when barrel polishing is performed on the ceramic body, the side margins are selectively worn at the corner portions of the ceramic body, and thus the internal electrodes disposed in the multi-layer unit are likely to be exposed. Particularly in the configuration having the thin covers and side margins, the internal electrodes are likely to be exposed.

Meanwhile, in this embodiment, as described above, the regions P including no internal electrodes are formed at both the end portions of the second region 119b in the Y-axis direction, i.e., at the corner portions excluding the covers 20 of the multi-layer unit 16.

FIG. 8 is an enlarged cross-sectional view of the second region 119b on the end surface T1 side of the unsintered ceramic body 111 shown in FIG. 18. It should be noted that the drawn portion 119 on the end surface T2 side has a configuration similar to that of the drawn portion 119 on the end surface T1 side except that the internal electrodes 113 are drawn to the end surface T2 instead of the internal electrodes 112, and thus description thereof will be omitted.

As shown in FIG. 8, the region P including no internal electrodes is disposed in the vicinity of the corner portion C111 of the ceramic body 111. With this configuration, even if the side margin 117 disposed at the corner portion C111 of the ceramic body 111 is selectively worn by the barrel polishing, the internal electrodes 112a and 112b are not exposed from the corner portion C111 of the ceramic body 111. Further, also when the corner portion C111 of the ceramic body 111 is worn in a large range including the side margin 117 and the cover 120, the internal electrodes 112 or 113 are not exposed from the corner portion C111 because a distance from the outer surface of each of the side margin 117 and the cover 120 to each internal electrode 112a, 112b is ensured at the corner portion C111 of the ceramic body 111.

With this configuration, the multi-layer ceramic capacitor 10 according to this embodiment can obtain high moisture resistance. Further, with this configuration, when the first external electrode 14 and the second external electrode 15 are formed, it is possible to inhibit a plating solution from being infiltrated from the corner portion C111 of the ceramic body 111.

Further, the region P is formed only at the corner portion of the multi-layer unit 116 excluding the cover 120 as described above. In other words, the region P is formed only in the vicinity of the corner portion C111 of the ceramic body 111, in which the side margin 117 is particularly likely to be thin. With this configuration, the intersectional area of the capacitance forming unit 118 can be ensured, and thus the multi-layer ceramic capacitor 10 having high moisture resistance and a large capacitance as described above can be produced.

Further, according to this embodiment, the region P is filled with the same type of ceramic material as that of the ceramic layers and the side margins 117. With this configuration, in Step S06 (Sintering), it is possible to inhibit the side margin 117 from being peeled from the corner portion C111 of the multi-layer unit 116 and to further obtain high adhesion between the multi-layer unit 116 and the side margin 117 at the corner portion. Accordingly, the multi-layer ceramic capacitor 10 according to this embodiment has high reliability.

3.9 Method of Adjusting Dimensions "a" to "d" of Ceramic Body 111

Here, a method of adjusting the dimensions "a" to "d" of the ceramic body 111 will be described. As described above, the dimension "a" is the thickness of the side margin 117 that covers the multi-layer unit 116 in the Y-axis direction. Therefore, the dimension "a" can be adjusted by the thickness of the side margin sheet 117s or a pressure for punching the side margin sheet 117s, in Step S04 (Formation of Side Margin).

The dimension "b" is a value corresponding to a distance in the Y-axis direction between the end portion of the internal electrode 112b in the Y-axis direction, the internal electrode 112b being located in the second region 119b, and the end portion of the internal electrode 112a in the Y-axis direction, the internal electrode 112a being located in the first region 119a. Therefore, the dimension "b" can be adjusted by patterning the internal electrode 112b (electrode non-formation region N2) of the third ceramic sheet 103 in a predetermined region, in Step S01 (Preparation of Ceramic Sheet).

The dimension "c" is the thickness of the cover 120 that covers the capacitance forming unit 118 and the drawn portion 119 in the Z-axis direction. Therefore, the dimension "c" can be adjusted by at least one of the thickness or lamination number of the fifth ceramic sheet 105 that is to be the cover 120, in Step S02 (Lamination).

The dimension "d" is a value corresponding to a distance in the Z-axis direction between the internal electrode 112a disposed on the outermost layer (uppermost layer or lowermost layer) in the first region 119a and the internal electrode 112b disposed on the outermost layer (uppermost layer or lowermost layer) in the second region 119b. Therefore, the dimension "d" can be adjusted by at least one of the thickness or lamination number of the third ceramic sheets 103 and the fourth ceramic sheets 104, which form the capacitance forming unit 118 and the second region 119b, in Step S02 (Lamination).

4. Examples

For Examples of the embodiment described above, 100 samples for each of 25 types (No. 1 to No. 25) of the multi-layer ceramic capacitors 10, in which the dimensions "a" to "d" of the ceramic body 11 are different for each type, were produced by using the production method described above with reference to FIG. 9. In each sample, the dimension along the X axis was set to 1.0 mm, and the dimensions in the Y- and Z-axis directions were each set to 0.5 mm.

A moisture resistance load test was performed on each sample. In the moisture resistance load test, the samples were held for 1,000 hours at a temperature of 45° C. and a humidity of 95% under application of a voltage of 10 V. For each of the samples, an electric resistance value was measured, and samples whose electric resistance value is equal to or larger than 10 MΩ were determined as normal and samples whose electric resistance value is smaller than 10 MΩ were determined as defective.

Table 1 shows, for each of the types, the configurations of the samples and evaluation results. Specifically, Table 1 shows the dimensions "a" to "d", the sum of the dimensions "a" and "b", a+b, and the sum of the dimensions "c" and "d", c+d, of each type of samples. Further, Table 1 shows a rate of the number of samples determined as defective in the 100 samples in the moisture resistance load test, i.e., a failure rate.

TABLE 1

| No. | a [μm] | b [μm] | a + b [μm] | c [μm] | d [μm] | c + d [μm] | Failure rate [%] |
|---|---|---|---|---|---|---|---|
| 1 | 10 | 0 | 10 | 10 | 0 | 10 | 25 |
| 2 | 10 | 5 | 15 | 10 | 1 | 11 | 13 |
| 3 | 10 | 10 | 20 | 10 | 1 | 11 | 11 |
| 4 | 10 | 15 | 25 | 10 | 1 | 11 | 10 |
| 5 | 10 | 20 | 30 | 10 | 1 | 11 | 10 |
| 6 | 10 | 25 | 35 | 10 | 1 | 11 | 10 |
| 7 | 15 | 5 | 20 | 10 | 1 | 11 | 11 |
| 8 | 15 | 10 | 25 | 10 | 1 | 11 | 10 |
| 9 | 15 | 15 | 30 | 10 | 1 | 11 | 10 |
| 10 | 20 | 0 | 20 | 10 | 0 | 10 | 10 |
| 11 | 20 | 10 | 30 | 10 | 1 | 11 | 10 |
| 12 | 10 | 1 | 11 | 10 | 5 | 15 | 20 |
| 13 | 10 | 1 | 11 | 10 | 10 | 20 | 18 |
| 14 | 10 | 1 | 11 | 10 | 15 | 25 | 15 |
| 15 | 10 | 1 | 11 | 10 | 20 | 30 | 15 |
| 16 | 10 | 1 | 11 | 10 | 25 | 35 | 15 |
| 17 | 10 | 1 | 11 | 15 | 5 | 20 | 17 |
| 18 | 10 | 1 | 11 | 15 | 10 | 25 | 15 |
| 19 | 10 | 1 | 11 | 15 | 15 | 30 | 15 |
| 20 | 10 | 0 | 10 | 20 | 0 | 20 | 15 |
| 21 | 10 | 1 | 11 | 20 | 10 | 30 | 15 |
| 22 | 10 | 10 | 20 | 15 | 5 | 20 | 3 |
| 23 | 15 | 5 | 20 | 10 | 10 | 20 | 2 |
| 24 | 15 | 5 | 20 | 15 | 5 | 20 | 1 |
| 25 | 10 | 10 | 20 | 10 | 10 | 20 | 0 |

As shown in Table 1, the samples Nos. 10 and 11 in which the dimension "a", which is the thickness of the side margin 17, is 20 μm or more, and the samples Nos. 20 and 21 in which the dimension "c", which is the thickness of the cover 20, is 20 μm or more, have a low failure rate of 20% or less, irrespective of the other dimensions in the dimensions "a" to "d". Thus, it was confirmed that the multi-layer ceramic capacitor 10 in which at least one of the dimension "a" or "c" is 20 μm or more has low necessity of applying the present disclosure thereto.

Further, the samples Nos. 2 to 9, 12 to 19, an 22 to 25, which satisfy either the conditions of b≥5 μm, and a+b≥15 μm or the conditions of d≥5 μm, and c+d≥15 μm or both, each have a low failure rate of 20% or less. On the other hand, the sample No. 1, which does not satisfy the conditions of b≥5 μm, and a+b≥15 μm, and also does not satisfy the conditions of d≥5 μm, and c+d≥15 μm, has a somewhat high failure rate of 25%. From those results, it was confirmed that the multi-layer ceramic capacitor 10 in which the dimensions "a" and "c" are less than 20 μm favorably satisfies either the conditions of b≥5 μm, and a+b≥15 μm or the conditions of d≥5 μm, and c+d≥15 μm or both.

In particular, in the samples Nos. 22 to 25 that satisfy all of the conditions of b≥5 μm, a+b≥20 μm, d≥5 μm, and c+d≥20 μm, the failure rate is very low and is 3% or lower. Further, in the sample No. 25 that further satisfies the conditions of b≥10 µm, and d≥10 µm, the occurrence of failures were not found. From those results, it was confirmed that the multi-layer ceramic capacitor 10 more favorably satisfies the conditions of a+b≥20 µm, and c+d≥20 µm, and most favorably the conditions of b≥10 µm, and d≥10 µm.

5. Other Embodiments

While the embodiment of the present disclosure has been described, the present disclosure is not limited to the embodiment described above, and it should be appreciated that the present disclosure may be variously modified as a matter of course.

For example, the method of producing the multi-layer ceramic capacitor 10 is not limited to the above method. Examples of the method of chamfering the multi-layer unit 116 in Step S05 of the production method described above include publicly known methods other than barrel polishing. For example, sandblasting or wet blasting can also be used.

In the embodiment described above, the electrode non-formation regions N2 formed in the internal electrodes 12b and 13b each have a substantially rectangular shape, but the shape is not limited as long as the regions in which at least the internal electrodes 12b and 13b are not disposed are formed at both the end portions of the second region 19b in the Y-axis direction. Examples of other shapes of the electrode non-formation region N2 include a triangle, a polygon, and a part of a circle such as a quadrant.

Further, in the embodiment described above, nothing is disposed in the electrode non-formation regions N1 and N2, but the electrode non-formation regions N1 and N2 may be made of a material similar to that of the ceramic layers and the side margins 17. This can inhibit the thickness dimension from being varied between the capacitance forming unit 18 and the drawn portion 19.

Additionally, in the embodiment described above, the multi-layer ceramic capacitor 10 has been described as an example of a multi-layer ceramic electronic component, but the present disclosure can be applied to general multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising:
   a ceramic body including
      a multi-layer unit including
         a capacitance forming unit including
            ceramic layers that are laminated in a first direction, and
            internal electrodes disposed between the ceramic layers,
         a side surface that faces in a second direction orthogonal to the first direction,
         an end surface that faces in a third direction orthogonal to the first direction and the second direction,
         a drawn portion that extends from the capacitance forming unit in the third direction, the internal electrodes being drawn to the end surface, and
      a cover that has a dimension less than 20 µm in the first direction and covers the capacitance forming unit and the drawn portion in the first direction; and
      a side margin that has a dimension less than 20 µm in the second direction and covers the side surface, having a density lower than that of the multi-layer unit,
   the drawn portion including
      a first region that is disposed at a center portion in the first direction, and
      a second region that is disposed between the cover and the first region, an end portion of each of the internal electrodes in the second direction in the second region being positioned inward in the second direction relative to an end portion of each of the internal electrodes in the second direction in the first region;
   wherein corner portions of the multi-layer ceramic electronic component are rounded, and
   wherein conditions are 5 µm≤b≤2.5a and (a+b)≥15 µm are satisfied,
   where "a" represents a dimension of the side margin in the second direction and "b" represents a distance in the second direction between the end portion of each of the internal electrodes in the second direction, which are disposed in the second region, and the end portion of each of the internal electrodes in the second direction, which are disposed in the first region.

2. The multi-layer ceramic electronic component according to claim 1, wherein
   conditions of 5 µm≤d≤2.5c, and c+d≥15 µm are satisfied,
   where c represents a dimension of the cover in the first direction, and d represents a distance in the first direction between one of the internal electrodes that is disposed on an outermost layer in the first region and another one of the internal electrodes that is disposed on an outermost layer in the second region.

3. A method of producing a multi-layer ceramic electronic component according to claim 1, the method comprising: producing a multi-layer unit including a capacitance forming unit including ceramic layers that are laminated in a first direction, and internal electrodes disposed between the ceramic layers, a side surface that faces in a second direction orthogonal to the first direction, an end surface that faces in a third direction orthogonal to the first direction and the second direction, a drawn portion that extends from the capacitance forming unit in the third direction, the internal electrodes being drawn to the end surface, and a cover that covers the capacitance forming unit and the drawn portion in the first direction, the drawn portion including a first region that is disposed at a center portion in the first direction, and a second region that is disposed between the cover and the first region, an end portion of each of the internal electrodes in the second direction in the second region being positioned inward in the second direction relative to an end portion of each of the internal electrodes in the second direction in the first region; forming a side margin on the side surface and producing a ceramic body; and chamfering the ceramic body.

4. The method of producing a multi-layer ceramic electronic component according to claim 3, wherein
   the ceramic body is chamfered by barrel polishing.

* * * * *